(12) United States Patent
Miyata et al.

(10) Patent No.: US 7,756,897 B2
(45) Date of Patent: Jul. 13, 2010

(54) TOPIC NET GENERATION METHOD AND APPARATUS

(75) Inventors: Ryosuke Miyata, Kawasaki (JP); Toshiyuki Fukuoka, Kawasaki (JP); Eiji Kitagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 11/121,001

(22) Filed: May 4, 2005

(65) Prior Publication Data
US 2005/0192959 A1    Sep. 1, 2005

Related U.S. Application Data

(63) Continuation of application No. PCT/JP03/00610, filed on Jan. 23, 2003.

(51) Int. Cl.
*G06F 17/30* (2006.01)
(52) U.S. Cl. .......................... 707/793; 707/944; 707/961
(58) Field of Classification Search ................... 705/26; 707/10, 104, 944, 961, 793; 709/217, 218
See application file for complete search history.

(56) References Cited

U.S. PATENT DOCUMENTS

| | | | |
|---|---|---|---|
| 5,740,425 A * | 4/1998 | Povilus | 707/100 |
| 6,697,502 B2 | 2/2004 | Luo | |
| 6,711,585 B1 * | 3/2004 | Copperman et al. | 707/104.1 |
| 6,795,808 B1 * | 9/2004 | Strubbe et al. | 704/275 |
| 7,143,040 B2 * | 11/2006 | Durston et al. | 704/270 |
| 7,337,158 B2 * | 2/2008 | Fratkina et al. | 706/45 |
| 7,403,899 B1 * | 7/2008 | Abella et al. | 704/275 |
| 2003/0105647 A1 | 6/2003 | Miyata et al. | |
| 2003/0126089 A1 | 7/2003 | Fukuoka et al. | |
| 2003/0126090 A1 | 7/2003 | Fukuoka et al. | |

(Continued)

FOREIGN PATENT DOCUMENTS

JP     1-216474     8/1989

(Continued)

OTHER PUBLICATIONS

Elmasri et al., Fundamentals of Database Systems, 2000, Addison Wesley, 3rd Edition, Section 7.4.2 (pp. 214-215); Section 20.2 (pp. 672-674).*

(Continued)

*Primary Examiner*—James Trujillo
*Assistant Examiner*—Albert Phillips
(74) *Attorney, Agent, or Firm*—Staas & Halsey LLP

(57) ABSTRACT

A topic net management unit 1 reads one record from a table to generate the topic net (S1). Subsequently, from among the field data in the record, the unit 1 generates nodes corresponding to the field data for which a corresponding topic class exists (S2). Topics corresponding to those nodes are generated. If a node having the same topic is already generated, then the unit 1 does not newly generate a node having a duplicate topic (S2). The unit 1 mutually links the generated topics in accordance with the definitions between the topic classes (S3). Further, using a dialog information template, the unit 1 generates dialog information associated with the generated link (S4). The unit 1 performs Steps S1-S4 processing for all records in the table (S5). If there is a plurality of tables Steps S1-S5 processing is performed for all tables (S6).

12 Claims, 18 Drawing Sheets

U.S. PATENT DOCUMENTS

2003/0202017 A1   10/2003   Fukuoka et al.

FOREIGN PATENT DOCUMENTS

| JP | 9-190453 | 7/1997 |
| JP | 10-269227 | 10/1998 |
| JP | 2001-195423 | 7/2001 |
| JP | 2002-203239 | 7/2002 |
| JP | 2003-167920 | 6/2003 |
| JP | 2003-256419 | 9/2003 |
| WO | WO 01/84394 A1 | 11/2001 |

OTHER PUBLICATIONS

Weiss, Data Structures and Problem Solving Using C++, 2000, Addison Wesley, 2nd Edition Chapter 18 (pp. 605-640), Chapter 19 (pp. 641-723).*

Dillenburg, Techniques for Improving the Efficiency of Heuristic Search, 1993.*

Shigeo Terabe et al., "A Model for Planning System Utterances to Generate Cooperative Answer in Concept Formation Support Dialogue", Information Processing Society of Japan Kenkyu Hokoku (98-NL-124), Mar. 13, 1998, vol. 98, No. 21, pp. 111 to 118.

Tadahuro Kitahashi et al., "Generating adequate answers based on users' interestings", The Institute of Electronics, Information and Communications Engineers Kenkyu Hokoku (NLC96-4), May 17, 1996, vol. 96, No. 46, pp. 21 to 26.

* cited by examiner (a)

(b)

| Message Type | Template | Direction | Message Flag |
|---|---|---|---|
| Explanation | In <Country>, <City> is famous. | → | S |
| Recommendation Explanation | Speaking of <Country>, I recommend <City>. | → | S |
| Question | In <Country>, would you like to go to <City>? | → | S |
| Explanation | <City> is in <Country>. | ← | S |
| Positive Response | I'd like to go to <City>. | → | U |
| Negative Response | I'm not interested in <City>. | ← | U |

FIG. 6
(a) 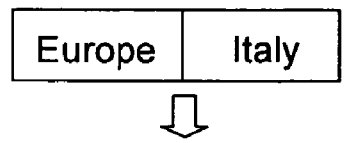
(b) 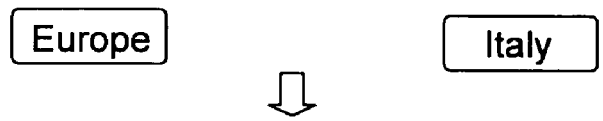
(c) 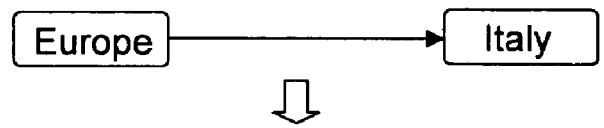
(d) 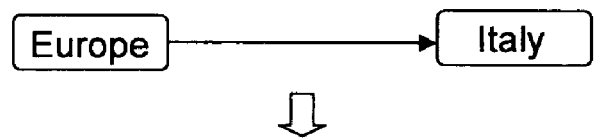
(e) 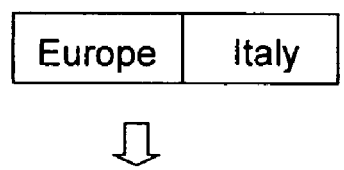
(f) 
(g) 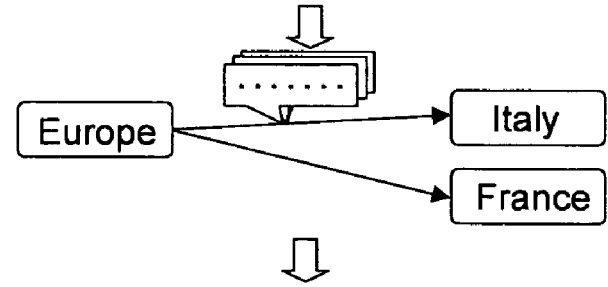

FIG. 8
(a)
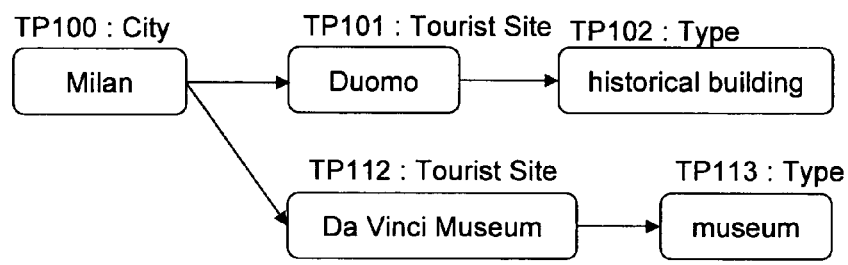
(b)
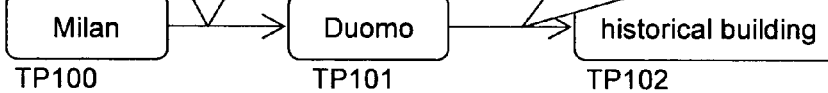

FIG. 9

Data in Tree Format

XML file

```
< Tourist Site Name= "Duomo" >
  < City of Site > Milan < / City of Site >
  < Type > historical building < / Type >
  < Fee > None < / Fee >
  < Renown > 10 < / Renown >
< Tourist Site >
```
One record having a tree structure

```
< /Tourist Site Name = "Da Vinci Museum" >
  < City of Site > Milan < / City of Site >
  < Type > museum < /Type >
  < Fee > None < /Fee >
  < Renown > 2< /Renown >
< /Tourist Site >
```

| Message Type | Template | Direction | Message Flag |
|---|---|---|---|
| Explanation | <City> has the <tourist site>. | → | S |
| Explanation | The <tourist site> is in <City>. | → | S |
| Question | In <City>, would you like to go to the <Tourist Site>? | → | S |
| Positive Response | I would like to go to the <Tourist Site>. | → | U |
| Negative Response | I'm not interested in the <Tourist Site>. | ← | U |

(b)

| Message Type | Template | Direction | Message Flag |
|---|---|---|---|
| Explanation | The <Tourist site> is a <Type>. | → | S |

(a)

| Topic ID |
| --- |
| Topic |
| Topic Class |
| Attribute Information 1 |
| Attribute Information 2 |
| ... |
| Attribute Information N |

| TP100 |
|---|
| Milan |
| City |

| TP101 |
|---|
| Duomo |
| Tourist Site |
| Type = historical building |
| Fee = 0 |
| Renown = 10 |

| TP112 |
|---|
| Da Vinci Science Museum |
| Tourist Site |
| Type = museum |
| Fee = 0 |
| Renown = 2 |

(b)
Recommendation Explanation:
If Renown > 7  then
    "The <Tourist Site> is a famous <Type>. By all means, let's go there."
else if Renown < 3 then
    "The <Tourist site> is a great out-of-the-way place."
else
    In <City>, the <Tourist site> is recommended.

TOPIC NET GENERATION METHOD AND APPARATUS

This is a continuation of International Application PCT/JP2003/000610, with an international filing date of Jan. 23, 2003.

BACKGROUND OF THE INVENTION

1. Field of the Invention

The present invention relates to a response technique, which uses a computer for selling, searching for, and inquiring about products and services suited to a user.

2. Background Information

Various interactive systems are conventionally available for selling, searching for, and inquiring about products and services using a computer. For example, Japanese Patent Application No. 2001-400675 recites an interactive system that can effectively exchange information between a computer user and a computer, while maintaining context. In further detail, in the abovementioned interactive system, a dialog having a context is conducted that considers contextual relationship, as with a dialog conducted between people. Consequently, the exchange between a user and the interactive system does not unfortunately end in one round trip. In addition, even if an exchange is repeated multiple times, those repetitions are mutually related, and not mutually independent.

In addition, with the abovementioned interactive system, a potential dialog pattern is dynamically created based on a topic net, wherein multiple topics are linked. This fundamentally differs from the method that prepares beforehand all dialog scenarios that can be executed by combining questions output by the interactive system with multiple choice responses to those questions. For a dialog based on such an interactive system to be effective, the topic net must include a sufficient number and range of topics registered in the dialog, and it must have sufficient dialog information for transitioning between topics.

Incidentally, to create a topic net, topics that will likely be registered in the dialog must be identified from various information sources, their interrelation must be analyzed, and messages to output for each topic must also be prepared. For example, let us consider the case of creating a topic net for an interactive system that sells a travel package. In this case, topics for various travel objectives and destinations must be collected from various information sources, such as geographical information, transportation facilities information, tourist site information, and event information, and those topics must be associated.

In so doing, the creation of a topic net can be said to be efficient compared with the preparation of a dialog scenario that hypothesizes all possible dialog flows, but it is problematic to create a topic net by manual means alone. In addition, even if one ventured to create a topic net manually, the dialog range covered by the topic net would tend to be insufficient.

In addition, if a specific topic is included in a topic net, then a dialog using that topic net becomes extremely effective. That is because the dialog is close to the user's perspective, and feels realistic. A conceivable source for collecting specific topics is the information in specific content written from a personal perspective, such as a travel journal or a product review. Presently, computers often handle such information. However, because that information is normally simply text data or image data, it is difficult to process that information, as is, with a computer.

However, many systems use databases in table format, principally relational databases. For example, much data is handled in table format, including product catalog information, store information, geographical information, tourist information, travel information, and information exchange bulletin board information. Furthermore, data in XML (extensible Markup Language) has become frequently used in recent years. XML formatted data is one type of tree formatted data, with each node of the tree having a "Content" and a "Type". The "Type" is called a tag in XML. In data described by XML, the data itself includes a description of the data contents, and its structure is also flexible; consequently, the usage of XML is progressing principally for the purpose of distributing data. Actually, the data format in the XML format is defined in numerous fields, including electronic commerce, publishing, travel, and maps. Data that has been handled so far by relational databases is also being converted to XML for distribution purposes.

It is an object of the present invention to provide a technique for efficiently creating, with little effort, a topic net that can respond to a wide-ranging dialog.

It is another object of the present invention to provide a method of expanding the information collection sources for generating a topic net.

SUMMARY OF THE INVENTION

To solve the abovementioned problems, one embodiment of the present invention provides a method of generating a topic net that includes nodes associated with topics and links that link each of the nodes. This method comprises the following steps:

a reading step that reads one record portion of data from a data table, wherein field data described in a plurality of fields is associated and stored;

a defining step that defines topic classes corresponding to all or a portion of the plurality of fields, and associations between each of the topic classes;

a node generating step that generates the nodes with respect to field data among the data read by the reading step, for which there exists a corresponding topic class, and topics corresponding to the nodes; and a link generating step that links each of the nodes generated by the node generating step in accordance with the associations between each of the topic classes defined by the defining step.

For example, consider a data table that stores as one record field data corresponding to the fields "Region", "Country" and "City". As topic classes corresponding to each of the fields, topic classes having the same names as the fields are defined: "Region", "Country" and "City". Associations between each of the topic classes are defined by generating links from "Region" to "Country", and from "Country" to "City". Let us assume that the read data is, for example, "Europe" as the region, "Italy" as the country, and "Milan" as the city. In so doing, nodes corresponding to "Europe", "Italy" and "Milan" are generated. The topics corresponding to each of the nodes become "Europe", "Italy" and "Milan". Subsequently, links are generated from "Europe" to "Italy", and from "Italy" to "Milan". The topic net is generated by repeating this for all data in the data table. In addition, one topic net can also be generated from a plurality of data tables.

In addition, a second embodiment of the present invention provides a method of generating a topic net that includes nodes associated with topics and links that link each of the nodes. This method comprises the following steps:

a reading step that reads one tree portion of data from a data file wherein field data described in a plurality of fields and a tree structure having the fields are defined;

a defining step that defines topic classes corresponding to all or a portion of the plurality of fields, and associations between each of the topic classes;

a node generating step that generates the nodes with respect to field data among the data read by the reading step, for which there exists a corresponding topic class, and topics corresponding to the nodes; and a link generating step that links each of the nodes generated by the node generating step in accordance with the associations between each of the topic classes defined by the defining step.

To cite data accumulating unit that defines data in a tree structure, there are, for example, XML files, and databases that store such files. For example, assume that a tree structure having the fields "City of Site" and "Type" is defined below the field "Tourist Site". Upon generating the links from "City of Site" to "Tourist Site", and from "Tourist Site" to "Type", the topic classes "Tourist Site", "City of Site" and "Type" corresponding to each of the fields are defined. Here, let us assume that the read data was, for example, "Duomo" as the tourist site, "Milan" as the city of site, and "historical building" as the type. In so doing, nodes corresponding to "Duomo", "Milan" and "historical building" are generated. The topics corresponding to each of the nodes become "Duomo", "Milan" and "historical building". Subsequently, links are generated from "Milan" to "Duomo", and from "Duomo" to "historical building". By repeating this, a topic net based on an existing data file is automatically generated.

In the abovementioned two embodiments, it is preferable that the node generating step includes a step that stops the generation of nodes having duplicate topics.

In addition, the defining step may further define a dialog information generating rule for generating dialog information that includes a message used to advance the dialog based on the topic net. The dialog information generating rule can generate the dialog information based on field data described in a field corresponding to two topic classes associated by the defining step.

To cite one example of a dialog information generating rule, there is "In <Country>, I recommend <City>". This dialog information generating rule generates dialog information based on field data described in the fields "Country" and "City" corresponding to the topic classes "Country" and "City". If the "Country" is Italy and the "City" is Milan, then the generated message is "In Italy, I recommend Milan". The dialog information that includes this message is associated with a link from the topic "Italy" to "Milan".

If topic classes corresponding to all fields included in one record are not defined, then it is acceptable to use in the generation of dialog information the field data described in a field for which there is no corresponding topic class. For example, let us assume that the abovementioned data table includes "Renown" in addition to "Region", "Country" and "City". In addition, assume that a topic class corresponding to "Renown" is not defined. Even in this case, a dialog information generating rule can be defined so that the message to be generated changes for the cases, for example, wherein the renown is 7 or less, or is greater than 7.

The dialog information generating rule may further include a direction that indicates from which node to which node, among the nodes of the two topic classes, the generated dialog information will be used to advance the dialog.

For example, the abovementioned dialog information generating rule "In <Country>, I recommend <City>". includes a direction from the topic class "Country" to "City". Thereby, the dialog of a conversation that uses the topic net advances from the "Country" to the more specific "City".

The dialog information generating rule may further include a message type that indicates what kind of property the message has.

For example, if the dialog information template is for generating a question message, then it includes the message type "Question". In addition, if the dialog information template is, for example, for generating an explanatory message, then it includes the message type "Explanation".

The present invention includes within its scope a topic net generating apparatus that executes the abovementioned method, a program, and a computer readable recording medium whereon that program is recorded. Here, a computer readable flexible disc, a hard disk, semiconductor memory, a CD ROM, a DVD, a magneto optic disk (MO), and others can be cited as recording mediums.

A third embodiment of the present invention provides a topic net generation method that includes nodes associated with topics, and links that link each of the nodes. In addition, in this method, the data unit includes a text message, and a data type that indicates the property of the abovementioned text message. This method includes the following steps:

a reading step that reads a data unit, a starting topic, and an ending topic that were correlated and stored;

a node generating step that generates nodes corresponding to the read starting topic and ending topic, and topics corresponding to the nodes;

a link generating step that generates a link from a node corresponding to the starting topic to a node corresponding to the ending topic; and a dialog information generating step that generates dialog information, which includes a message used to advance the dialog based on the topic net and a message type that indicates the property of the message, based on the data unit, and associates the dialog information with the link generated by the link generating step.

Using this method enables the generation of a topic net based on, for example, a travel journal prepared by an individual.

In the third embodiment, if the node corresponding to the starting topic and the node corresponding to the ending topic are identical nodes, then the link generating step may stop the generation of a link. If the generation of a link is stopped, the dialog information generating step may associate generated dialog information with the node.

In this case, the generated dialog information is associated not with a link, but with a node, i.e., a topic.

In the third embodiment, the abovementioned data unit may further include supplementary information. If there exists a plurality of data units that include the same data type for identical links or identical nodes, then the dialog information generating step can select any one of the data units based on the supplementary information, and generate dialog information based on the selected data unit.

For example, if the supplementary information is the creation date and time of the data unit, then the dialog information can be generated based on the latest data unit.

In the third embodiment, the dialog information generating step can generate the dialog information based on the supplementary information.

To cite an example of supplementary information, there is the usage of the creation date and time of text data included in a data unit. If the creation date and time is old, then the preface "This is from a while back" can be added to the head of the message generated based on the text data.

In the third embodiment, it is preferable that the node generating step includes a step that stops the generation of nodes having duplicate topics.

The topic net generating apparatus that executes the above-mentioned method, the program, and the computer readable recording medium whereon that program is recorded are included within the scope of the present invention.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 and FIG. 7 are explanatory diagrams that depict the generation processing that generates the topic net depicted in FIG. 2(a) in accordance with the flowchart depicted in FIG. 5;

FIG. 8(a) is an explanatory diagram that depicts one example of another topic net;

FIG. 8(b) is an explanatory diagram that depicts one example of the dialog information in the topic net depicted in FIG. 8(a);

FIG. 9 is an explanatory diagram that depicts one example of data in tree format that forms the basis of the topic net;

FIGS. 11(a) and (b) are explanatory diagrams that depict one example of the dialog information template depicted in FIG. 10(b);

FIG. 15(a) is an explanatory diagram that depicts a concrete example of topic data in the topic net depicted in FIG. 8(a);

FIG. 15(b) is an explanatory diagram that depicts one example of a dialog generation script for generating the topic net depicted in FIG. 8(a);

DETAILED DESCRIPTION OF THE PREFERRED EMBODIMENTS

Figure 1:
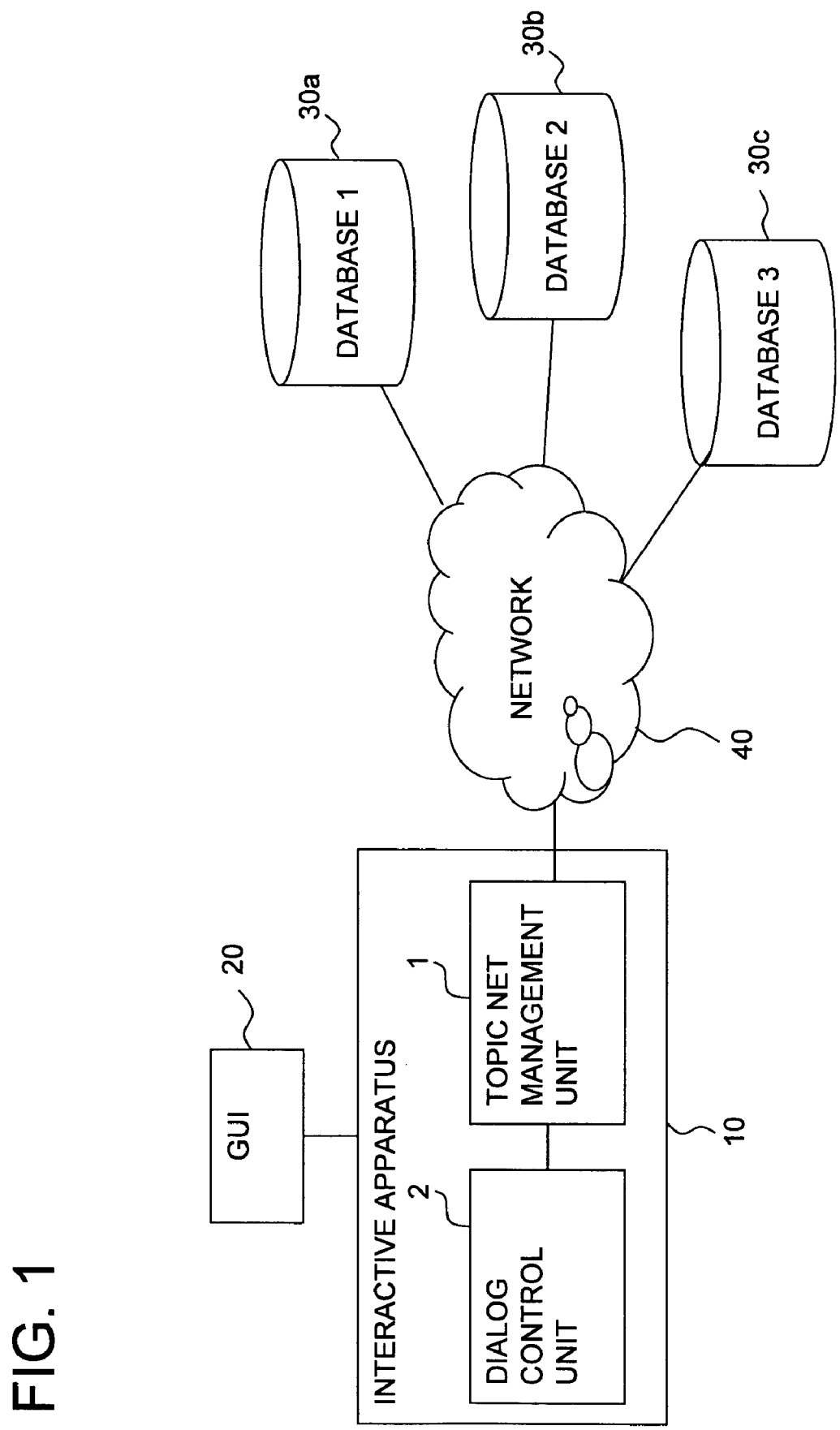
FIG. 1 is an explanatory diagram that depicts the constitution of an interactive apparatus that applies the present invention.

FIG. 1 depicts the constitution of an interactive system that applies the present invention. The interactive system includes an interactive apparatus 10 and a GUI (Graphical User Interface) 20. The interactive apparatus 10 and the GUI 20 operate on a computer connected to an input/output unit, such as a mouse, a display, and a touch panel.

The interactive apparatus 10 comprises a topic net management unit 1 that generates the topic net, and a dialog control unit 2 that advances the dialog based on the topic net. The topic net management unit 1 can access databases 30a, b, c for generating the topic net. It is acceptable for the databases 30a, b, c to be constructed on a hard disk of the computer whereon the interactive apparatus 10 is loaded. In addition, the databases 30a, b, c may also be constructed so that the interactive apparatus 10 can access them via a network 40. The data stored in the databases 30a, b, c is not particularly limited to table format, tree format, XML format, and the like, as discussed later. It is also acceptable to generate one topic net from data having a plurality of formats.

The topic net management unit 1 can generate a topic net in batch mode before the start of the dialog between the user who operates the GUI 20 and the interactive apparatus 10. In addition, it is also acceptable to generate the topic net little by little, in accordance with the progress of the dialog. If generating the topic net in accordance with the progress of the dialog, then it is also acceptable to generate a topic net that includes topics that have become necessary in accordance with the progress of the dialog, and topics peripheral thereto. In so doing, unnecessary topic net generation can be prevented, thereby eliminating the wasteful usage of computer resources for storing unnecessary data. In addition, it is also acceptable for the topic net management unit 1 to store the creation date and time of a previously generated topic net, and to delete old portions for which a fixed period of time has elapsed. In so doing, the topic net can be continually maintained in a fresh state. In addition, it is also acceptable for the topic net management unit 1 to store for later use the usage frequencies of the topics included in the topic net, and the usage frequencies of the dialog information, which is discussed later. Thereby, detecting portions of the topic net whose usage frequency is low and deleting such portions from the topic net enables the continuous maintenance of a state wherein the entire topic net is effectively used.

Topic Net

Figure 2:
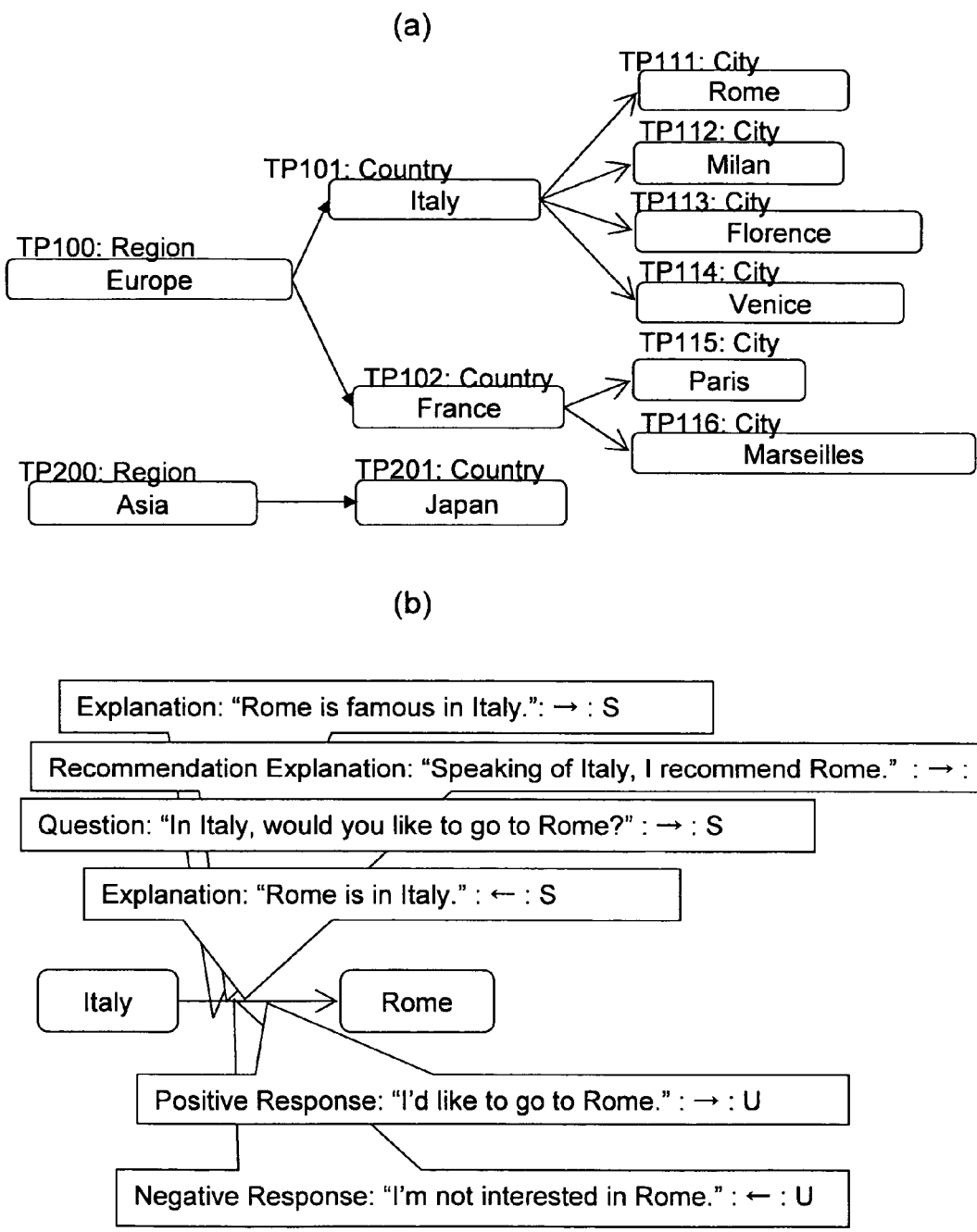
FIG. 2(a) is an explanatory diagram that depicts one example of the topic net.
FIG. 2(b) is an explanatory diagram that depicts one example of the dialog information in the topic net depicted in (a) of the same figure.

The following explains a topic net generated by the present invention, and an application thereof. FIG. 2 is a conceptual explanatory diagram of the topic net. The topic net includes links that link nodes, as depicted in (a) of the same figure. A topic and a topic ID are associated with each node. A topic ID is an identifier that designates a node of the topic net. For example, the topic ID "TP111" identifies the node having the topic "Rome". In addition, dialog information is associated with each topic and link. Dialog information is information that includes a text message for advancing the dialog using the topic net. In a dialog that uses the topic net, the dialog progresses by changing the topic along the links that link each topic. Furthermore, in the example shown in FIG. 2, the links that link each topic have a direction. This direction indicates that the topic of the link destination is more specific than the topic of the link source. However, there are also cases in which the link direction has a different meaning, depending on the topic net. In addition, there are also cases in which the link does not necessarily have a direction.

FIG. 2(b) depicts one example of dialog information associated with a link. This example indicates the dialog information associated with the link from the topic "Italy" to the topic "Rome". The text messages included in the dialog information are specifically divided into system messages and user messages. A system message is a text message for the interactive apparatus 10 to output to the user. A user message is a text message that the user can select as one's own statement to the interactive apparatus 10. Dialog information includes either a message flag "S" that indicates a system message, or a message flag "U" that indicates a user message. Furthermore, dialog information may include not only a text message, but also an image file or a voice file.

In addition, as described by this example, dialog information includes a message type that indicates the text message property. In this figure, "Explanation", "Recommendation Explanation", "Question", "Positive Response", and "Negative Response" are illustrated as message types. Furthermore, dialog information associated with a link includes the "Direction" that defines from which topic to which topic to transition, depending on the text message. In other words, the "Direction" indicates whether the text message is one used when the link is followed in some direction.

The dialog information is used, for example, as follows. Let us assume that the interactive apparatus 10 has output one system message associated with the link from the topic "Italy" to the topic "Rome": "In Italy, would you like to go to Rome?" In response, if the user selects the positive response, "I'd like to go to Rome", then the topic advances from "Italy" to "Rome". In so doing, changing the topic advances the dialog.

First Embodiment

The following is a concrete explanation of the method by which the topic net management unit 1 of the interactive apparatus 10 generates a topic net. The present embodiment explains a method of generating a topic net based on data in table format. To facilitate the explanation, the case of generating the topic net depicted in FIG. 2 will be explained. Furthermore, each node of the topic net generated by the method below is correlated with a topic class. In the example of this figure, the topic classes are "Region", "Country" and "City". The topic classes are defined beforehand, prior to the generation of the topic net. The details of the definitions of the topic classes will be discussed later.

Figure 3:
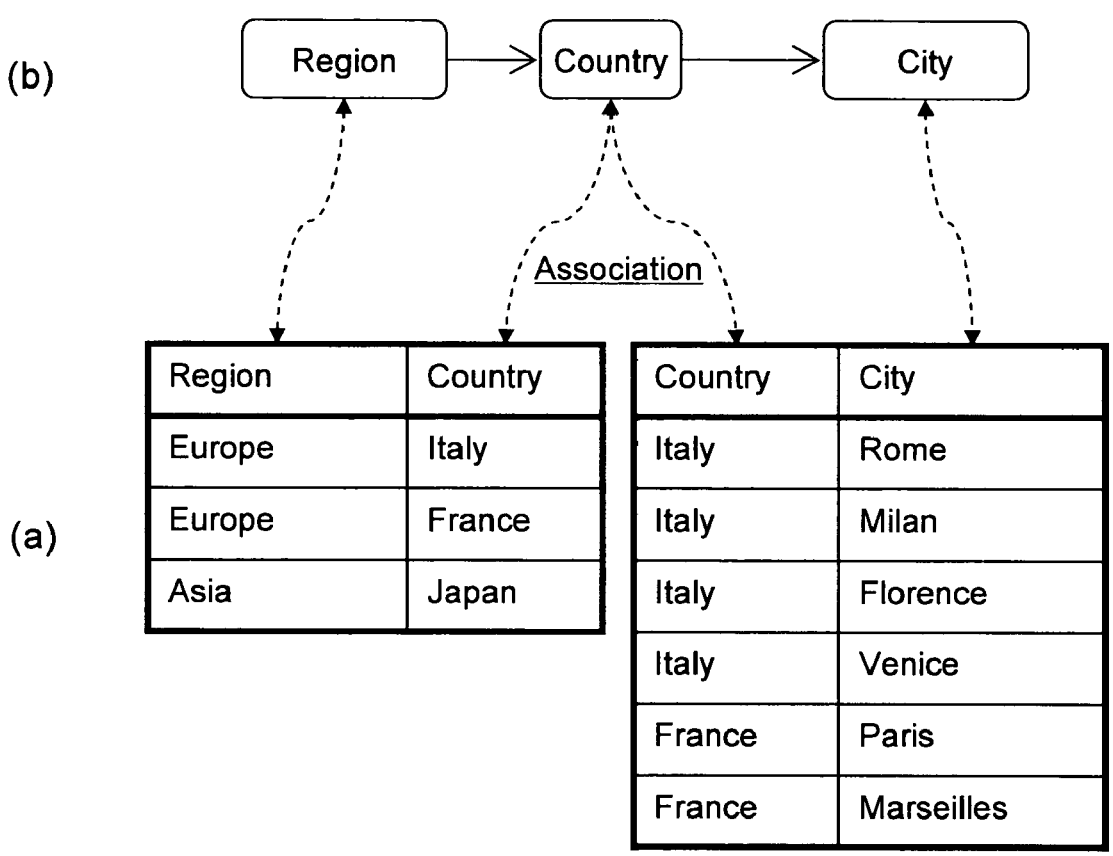
FIG. 3(a) is an explanatory diagram that depicts one example of data in table format that forms the basis of the topic net.
FIG. 3(b) is an explanatory diagram that depicts one example of the definition of a topic class, and one example of the definition of an association between topic classes.

FIG. 3(a) depicts one example of data in table format that forms the basis of generating the topic net in FIG. 2. Here, two tables have been created. In one table, the "Region" and the "Country" are correlated and stored in one record. In the other table, the "Country" and "City" are correlated in one record.

FIG. 3(b) illustrates, for these types of tables, the definitions of topic classes correlated with all or a portion of the table fields. In addition, this figure illustrates the definitions of the associations between topic classes. In this example, topic classes corresponding to all fields are defined. In this example, the field names ("Region", "Country" and "City") and the topic class names ("Region", "Country" and "City") are identical. In addition, the definitions between the topic classes are defined so as to generate links from the "Region" to the "Country", and from the "Country" to the "City".

The nodes of the topic net, the topics of the nodes, and the links that link the nodes are generated in accordance with the definitions of such topic classes and the definitions of the associations between the topic classes. Consider an example in which nodes corresponding to topic classes "Country" and "City", a topic for each node, and a link from "Country" to "City" are generated. More specifically, nodes having the topic "Italy" and the topic "Rome" are respectively generated from field data "Italy" and "Rome" that form one record. In addition, a link is generated from the topic "Italy" to the topic "Rome". Here, "Italy" and "Rome" correspond respectively to the topic classes "Country" and "City".

Figure 4:
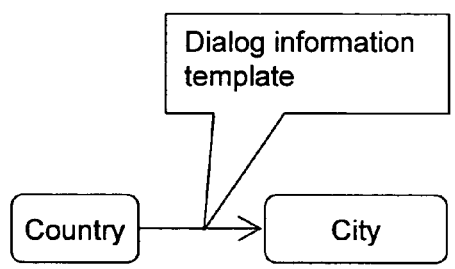
FIG. 4(a) is an explanatory diagram that depicts the fact that a dialog information template is defined in a link that associates topic classes.
FIG. 4(b) is an explanatory diagram that depicts one example of the dialog information template depicted in (a) of the same figure.

FIG. 4(a) shows that a dialog information template is further defined in each link that is defined between topic classes. A dialog information template generates the dialog information associated with the link that links each topic. FIG. 4(b) is one example of a dialog information template defined in the link from the topic class "Country" to the topic class "City". The dialog information template includes a "Template", a "Message Type", a "Direction" and a "Message Flag" for generating the text messages.

The "Template" is defined so that a text message is completed based on the field data described in the fields in one record. The field data corresponds to the topic classes of a node linked by a link wherein the generated dialog information is associated. Consider an example in which a text message is completed by embedding data in the <Country> and <City> of the template, "In <Country>, <City> is famous". For example, the data of the field "Country", e.g., "Italy", corresponding to the topic class "Country" is embedded in the <Country>. The data of the field "City", e.g., "Rome", corresponding to the topic class "City" is embedded in <City>. The message type stipulates the message type of the dialog information generated by the template. The "Direction" stipulates the direction of the dialog information generated by the template. The "System Flag" stipulates the system flag "S/U" of the text message generated by the template.

Figure 5:
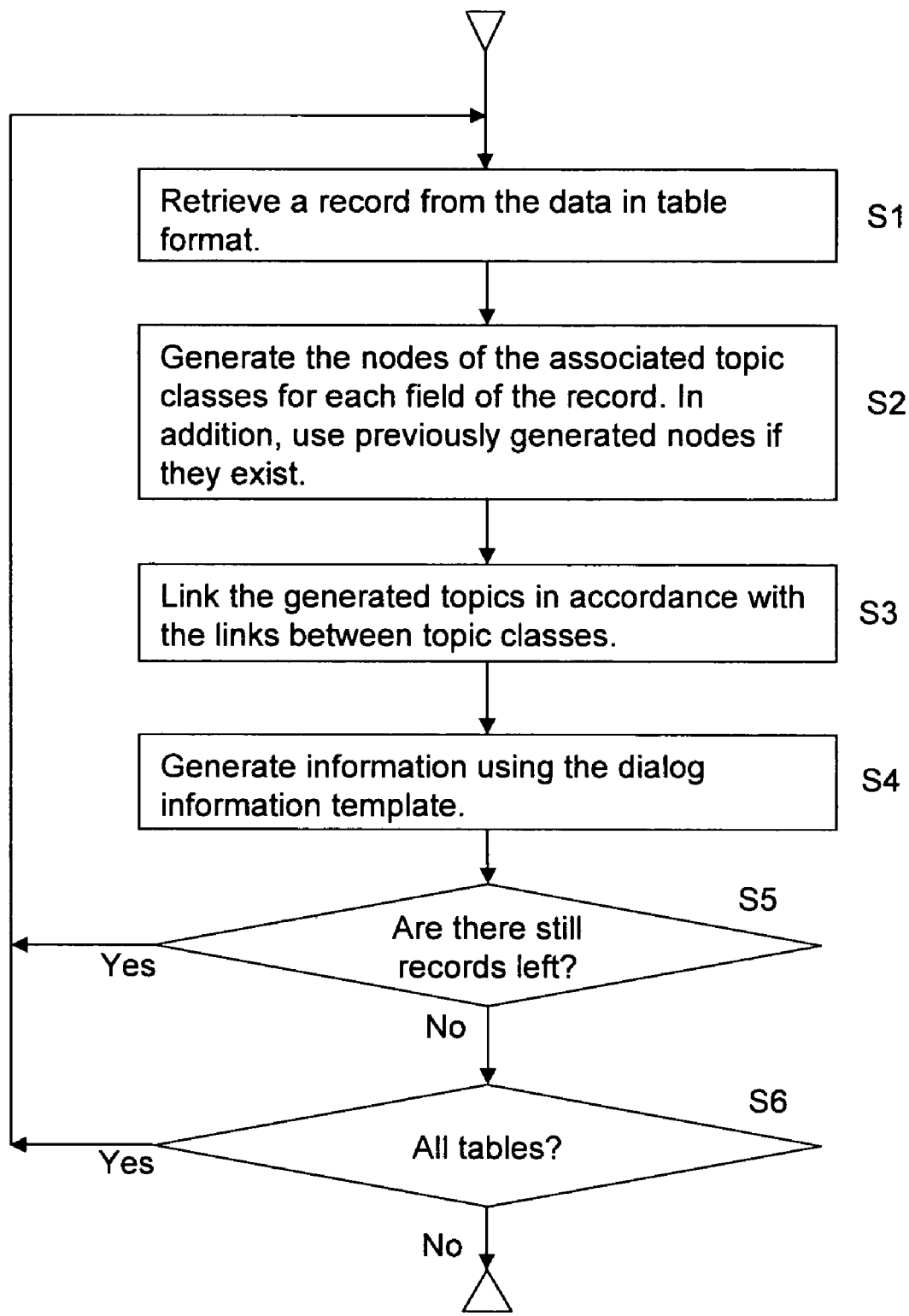
FIG. 5 is a flowchart that depicts one example of the generation processing flow that generates a topic net based on data in table format.

FIG. 5 is a flowchart that depicts one example of the generation processing flow executed by the topic net management unit 1. This generation processing generates a topic net from data in table format.

Step S1: First, the topic net management unit 1 reads one record portion of data from the collection of data in table format.

Step S2: Subsequently, from among the field data included in the record that was read, the topic net management unit 1 generates, based on the definitions of the topic classes, nodes corresponding to the field data for which a corresponding topic class exists. In addition, topics corresponding to those nodes are generated. In the present embodiment, the topic is the same as the field data. In addition, if a node having the same topic is already generated, then the topic net management unit 1 does not newly generate a node having a duplicate topic.

Step S3: The topic net management unit 1 mutually links the generated topics in accordance with the definitions between the topic classes.

Step S4: Further, using the dialog information template, the topic net management unit 1 generates the dialog information associated with the generated link.

Step S5: The topic net management unit 1 performs Steps S1-S4 processing for all records included in the data in table format.

Step S6: If there is a plurality of tables to generate the topic net, then the topic net management unit 1 performs Steps S1-S5 processing for all tables.

Figure 7:
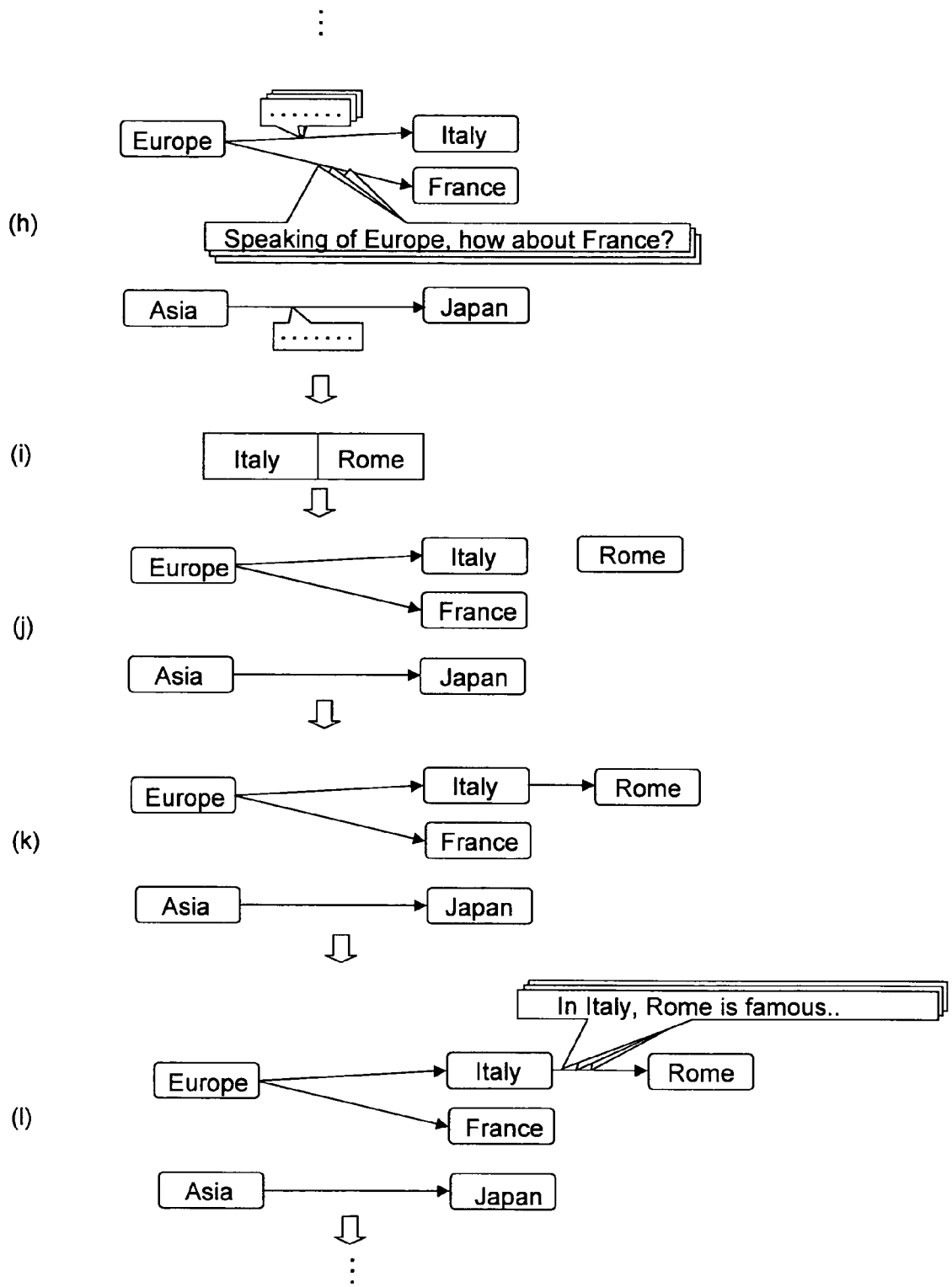

FIG. 6 and FIG. 7 are explanatory diagrams that depict the process by which the topic net management unit 1 generates a topic net based on the flowchart in FIG. 5. To facilitate the explanation, the data in table format, the definitions of the topic classes, the definitions associated between topic classes and the definition of the dialog information template shown in FIG. 2 through FIG. 4 will be used.

First, one record is read from one of the tables. The region "Europe" and the country "Italy" are included in this record (FIG. 6(*a*)). Subsequently, the respective nodes and topics are generated for the field data "Europe" and "Italy" corresponding to the topic classes "Region" and "Country" ((b) in the same figure).

Subsequently, the generated nodes are linked in accordance with the definition of the link from "Region" to "Country". Mainly, a link from the topic "Europe" to the topic "Italy" is generated ((c) in the same figure). Dialog information is generated for the generated link based on the template for the link from "Region" to "Country" ((d) in the same figure). The same processing is repeated for the next record, which includes "Europe" and "France". However, because a node having the topic "Europe" has already been generated, a new node and topic are not generated based on the field data "Europe". Likewise, for the region "Asia" and particularly the record that includes "Japan", the topics "Asia" and "Japan" are generated, and a link connecting the topics as well as the dialog information are generated ((e) in the same figure through FIG. 7(*h*)).

When all data in table format correlated with "Region" and "Country" have been read, the data in table format correlated with "Country" and "City" are subsequently read sequentially (FIG. 7(*i*)). For example, in this table, the first record "Italy" and "Rome" is read. Because a node having the topic "Italy" has already been generated, a new node and topic based on the field data "Italy" is not generated. However, a node corresponding to the field data "Rome" as well as its topic "Rome" do not yet exist, so they are newly generated ((j) in the same figure). Subsequently, a link is generated from the topic "Italy" to the topic "Rome" in accordance with the definition of the link from "Country" to "City" ((k) in the same figure). Subsequently, the dialog information is generated based on the template for the link from "Country" to "City" ((l) in the same figure). The topic net is generated by repeating this processing for all records.

As discussed above, if the fields of data in table format and the definitions between classes are prepared in advance, then the topics of the topic net can be automatically generated just by preparing the tables and records. In addition, if there exists data in table format prepared for another purpose, then a topic net can be automatically generated by defining the definitions between topic classes suited thereto. In so doing, a topic net having an enormous number of topics can be efficiently generated utilizing an existing database.

Second Embodiment

The following explains the method by which the topic net management unit 1 of the interactive apparatus 10 generates a topic net based on data in tree format. To facilitate the explanation, let us consider the case of generating the topic net depicted in FIG. 8. FIG. 8(*a*) depicts one example of another topic net. This topic net includes nodes, and directional links that link each node. Each node is correlated with a topic, a topic ID, and a topic class. In addition, dialog information is associated with each node.

FIG. 8(*b*) is an explanatory diagram that depicts one example of dialog information included in the topic net in (a) in the same figure. This example shows dialog information associated with the link from the topic "Milan" to the topic "Duomo", and the dialog information associated with the link from the topic "Duomo" to the topic "historical building". Dialog information is likewise associated with other links.

FIG. 9 is one example of data in tree format that forms the basis of the topic net depicted in FIG. 8. In this example, an XML file describes data in tree format. With an XML file, the position in the tree can be defined by the tag type and the attribute value enclosed by the tag. In this figure, the portion interposed by the tags <Tourist Site> corresponds to one record of data in table format, and has a tree structure. Furthermore, the collection of data in tree format can be described not only by an XML file, but also by an ordinary text file, an SGML (Standard Generalized Markup Language) file, an HTML (Hyper Text Markup Language) file, and the like, and the file format is not particularly limited.

Figure 10:
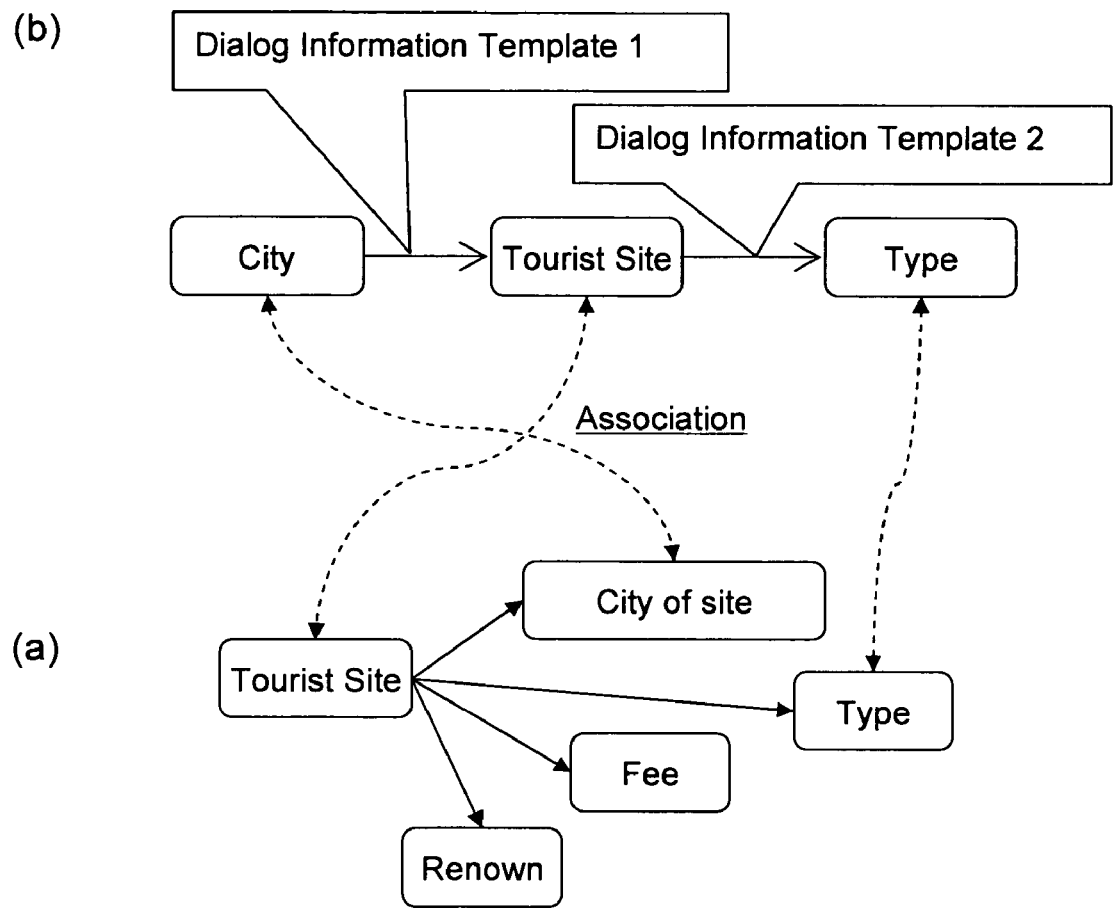
FIG. 10(a) is an explanatory diagram that depicts the definition of a tree structure.
FIG. 10(b) is an explanatory diagram that depicts one example of the definition of a topic class, one example of the definition of the association between topic classes, and the fact that a dialog information template is defined in the link that associates topic classes.

FIG. 10(*a*) is an explanatory diagram that depicts a tree structure that describes the XML file shown in FIG. 9. The tree structure possessed by the XML file is formed by the XML file tags "Tourist Site", "City of Site", "Type", "Fee" and "Renown" having a hierarchy. In the single tree of the XML file in FIG. 9, the tags "City of Site", "Type", "Fee" and "Renown" are respectively positioned below the tag "Tourist Site". FIG. 10(*b*) illustrates topic classes, and the definitions of their associations. In this figure, the topic classes and the definitions of their associations are defined for the tree structure in (a) in the same figure. In this example, topic classes are defined corresponding to three tags from among the five types of tags included in the XML file. Specifically, the topic class "Tourist Site" is defined corresponding to the tag <Tourist Site>, the topic class "City" is defined corresponding to the tag <City of Site>, and the topic class "Type" is defined corresponding to the tag <Type>. Topic classes corresponding to the tags <Fee> and <Renown> in the XML file are not defined. A link from the topic class "City" to "Tourist Site" and a link from "Tourist Site" to "Type" are respectively defined as the associations of the three topic classes. It is preferable that the links that link the topic classes be defined so that they correspond to a tree structure, but they do not necessarily have to correspond.

The nodes of the topic net, the topics of the nodes, and the links that link the nodes are generated in accordance with the definitions of such topic classes and the definitions of the associations between topic classes. For example, nodes corresponding to the topic classes "City" and "Tourist Site", a topic for each node, and a link from "City" to "Tourist Site" are generated. More specifically, nodes having the topic "Duomo" and the topic "Milan" are respectively generated from the field data "Duomo" and "Milan" that form one tree. In addition, a link from the topic "Milan" to the topic "Duomo" is generated. Here, "Duomo" and "Milan" respectively correspond to the topic classes "Tourist Site" and "City".

In addition to the definitions between topic classes, FIG. 10(b) further depicts the definitions of the dialog information templates. In this figure, the dialog information template 1 is defined in the link from the topic class "City" to "Tourist Site". In addition, the dialog control unit 2 is defined in the link from the topic class "Tourist Site" to "Type". FIGS. 11(a) and (b) respectively depict one example of the dialog information templates 1 and 2. A dialog information template includes a template, a message type, a direction, and a message flag, the same as the dialog information template in the abovementioned data in table format.

Figure 12:
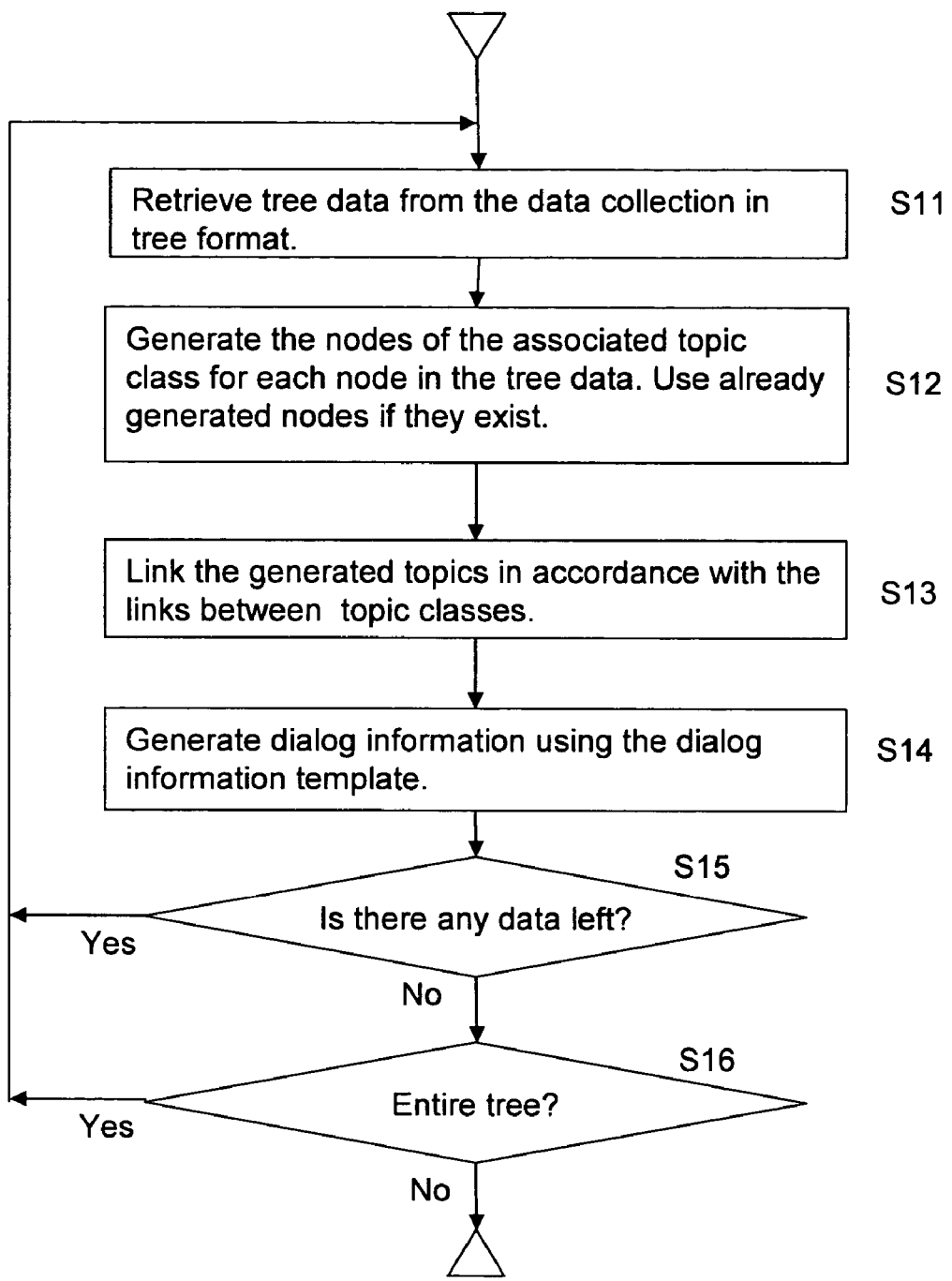
FIG. 12 is a flowchart that depicts one example of the generation processing flow that generates a topic net based on data in tree format.

FIG. 12 is a flowchart that depicts one example of the generation processing flow by which the topic net management unit 1 generates a topic net from data in tree format.

Step S11: First, the topic net management unit 1 reads one tree portion of data from the collection of data in tree format such as an XML file (S11).

Step S12: Subsequently, the topic net management unit 1 generates the nodes of the topic net and their topics for the nodes that form the tree, e.g., for those tags in the XML file for which a corresponding topic class exists. The topics of the nodes are the attribute values of the nodes in the tree, e.g., the attribute values of the tags in the XML file. If a node having a topic the same as the attribute value of a node in the tree has already been generated, then it is not necessary to newly generate the node and the topic.

Step S13: The topic net management unit 1 links the generated topics in accordance with the definitions of the associations between topic classes.

Step S14: Furthermore, the topic net management unit 1 uses the dialog information template defined in each link to generate the dialog information associated with the generated link.

Step S15: Subsequently, the topic net management unit 1 judges whether there is any data in the data collection, e.g., the XML file, that has not been read, and repeats the processing of the abovementioned Steps S11-S14 for all data.

Step S16: The topic net management unit 1 executes the processing of the abovementioned mentioned Steps S11-S15 for all data collections in tree format that form the basis of the topic net. For example, one topic net can be generated based on a plurality of XML files, and one topic net can be generated based on an XML file and an HTML file.

Figure 13:
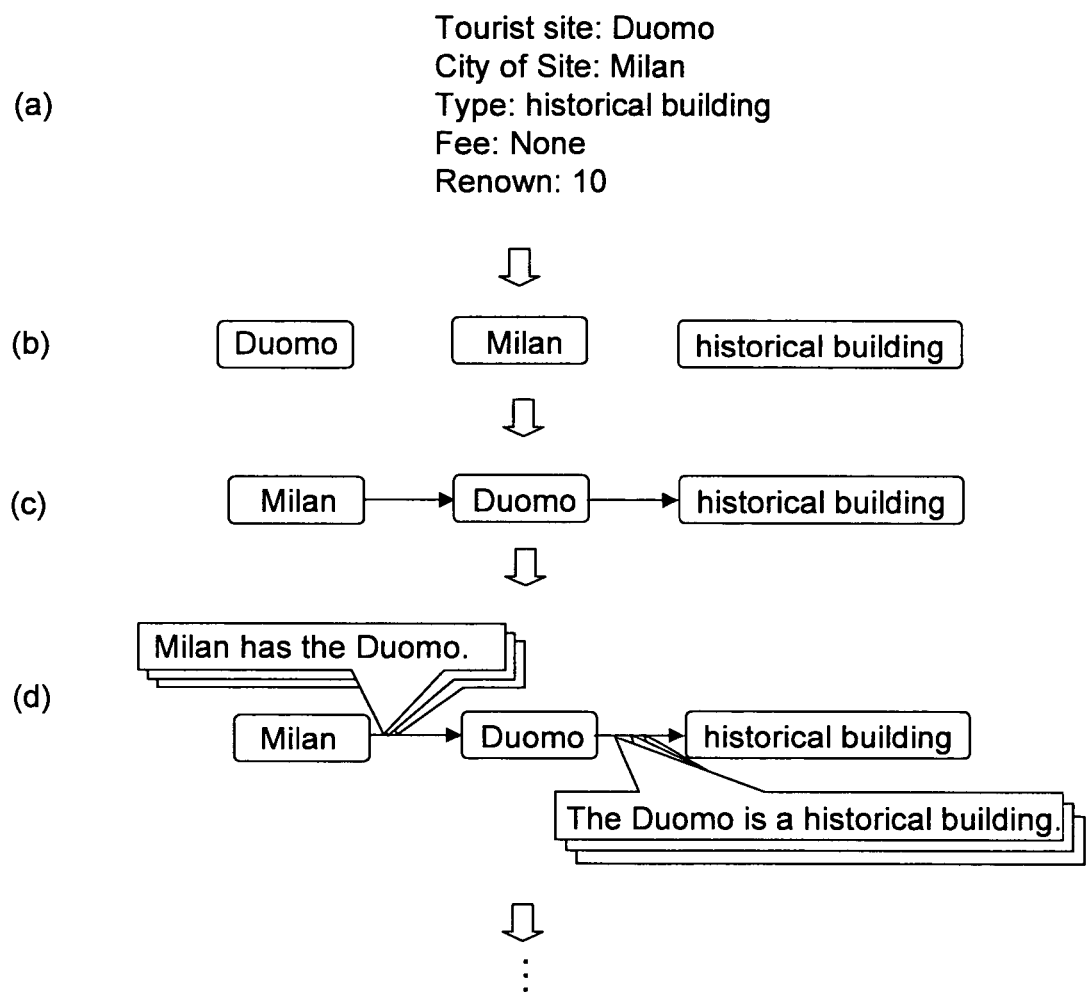
FIG. 13 is an explanatory diagram of the generation processing that generates the topic net in FIG. 8(a) in accordance with the flowchart depicted in FIG. 12.

FIG. 13 is an explanatory diagram that depicts the process by which the topic net management unit 1 generates a topic net based on the flowchart in FIG. 12. To facilitate the explanation, the data in tree format, the definitions of the topic classes, the definitions of the associations between topic classes, and the definitions of the dialog information templates are as shown in FIG. 9 through FIG. 11.

First, one tree portion of data is read from the XML file (FIG. 13(a)). For example, the tourist site "Duomo", the city of site "Milan", the type "historical building", the fee "None" and the renown "10" are read. Subsequently, the nodes and their topics are generated for the attribute values of tags, among the tags that constitute the tree, for which a corresponding topic class exists ((b) in the same figure). The actual attribute values of the tags corresponding to the topic classes form the nodes and topics corresponding to the tags. For example, the topic for the node generated for the tag <Tourist Site> corresponding to the topic class "Tourist Site" is set to "Duomo". In addition, the topic for the node generated for the tag <City of Site> corresponding to the topic class "City" is set to "Milan".

Subsequently, each of the generated topics is linked in accordance with the definitions of the associations between the topic classes ((c) in the same figure). Thereby, the link from the topic "Milan" to the topic "Duomo", and the link from the topic "Duomo" to the topic "Historical Building" are respectively generated. Dialog information for the generated links is generated in accordance with the dialog information templates ((d) in the same figure). This is repeated for all data in tree format included in the XML file. In addition, if one topic net is generated based on a plurality of data files in tree format, then this processing is repeated for each file. Thereby, a topic net can be generated based on data in tree format.

By making the topic classes and the definitions between the topic classes suited to the collection of data in tree format, as discussed above, a topic net that includes an enormous amount of topics can be automatically generated from data in tree format.

Third Embodiment

The method of generating dialog information is not limited to generation by a dialog information template. In the present embodiment, the topic net management unit 1 generates dialog information based on a dialog generation script. To facilitate the explanation, we will take up an example of generating dialog information for the topic net shown in FIG. 8.

Figure 14:
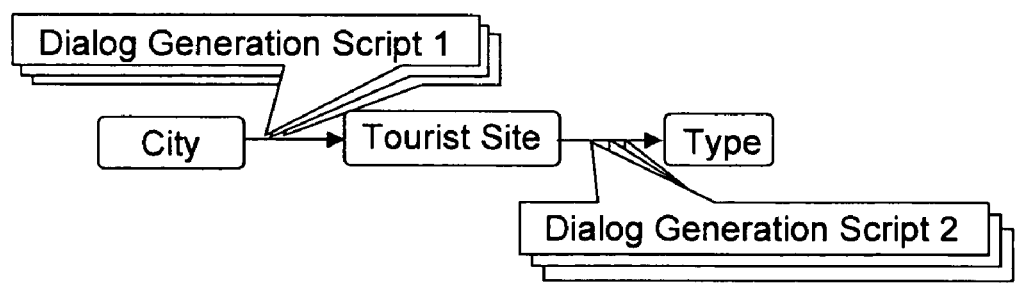
FIG. 14(a) is a conceptual explanatory diagram of topic data associated with a topic of a topic net.
FIG. 14(b) is an explanatory diagram that depicts the generation of dialog information using a dialog generation script.

First, as shown in FIG. 14(a), not only are the topic ID, the topic, and the topic class correlated with the nodes that constitute the topic net, but attribute information is also correlated. Furthermore, as shown in FIG. 14(b), a dialog generation script is defined in each link. This dialog generation script generates dialog information based on the topics, the topic classes, and the attribute information. The attribute information can be extracted from a data collection in table format or a data collection in tree format.

FIG. 15(a) is an explanatory diagram that depicts a specific example of attribute information. The node TP101 and the node TP112 each have a "Type", a "Fee" and a "Renown" as attribute information. In this example, among the tags, and their attribute values, that constitute the tree of the XML file shown in FIG. 9, the tags, and their attribute values, for which a corresponding topic class does not exist are used in the attribute information of the nodes corresponding to the tags at the vertices of the tree structure. In other words, the tags <Type>, <Fee> and <Renown>, and their attribute values form the attribute information of the nodes corresponding to the tags <Tourist Site> at the vertices in the tree structure.

FIG. 15(b) is an explanatory diagram that depicts a specific example of a dialog generation script. This example describes a dialog generation script that generates dialog information based on the data shown in the abovementioned FIG. 15(a). This dialog generation script is defined with respect to the link from the topic class "City" to "Tourist Site". In addition, this dialog script generates a text message based on the topic classes "Tourist Site" and "City", and the value of the attribute information "Renown".

If a dialog generation script is used, the dialog information can be generated more flexibly than with a dialog information template. The generation of dialog information using a dialog generation script can be applied even in the case of generating a topic net from data in table format, or even in the case of generating a topic net from data in tree format. In addition, it can also be applied even in the case of generating a topic net with a combination of data in both formats.

Fourth Embodiment

The topic net management unit 1 can generate a topic net based on a data collection other than data in table format and data in tree format. To effectively conduct a dialog using a topic net, it is preferable that the topic net be provided with a specific dialog based on personal experience. For example, if generating a topic net for searching for products, then product review articles or writings of impressions on bulletin boards can be cited as data that provides such topics. In addition, if generating a topic net for deciding a travel location, then a travel journal can be cited. Furthermore, if generating a topic net for searching for a restaurant, then articles introducing restaurants can be cited. Now, a method of generating a topic net based on such data will be explained. To simplify the explanation, the following explains an example for the case in which a travel journal is used in the generation of a topic net.

Figure 16:
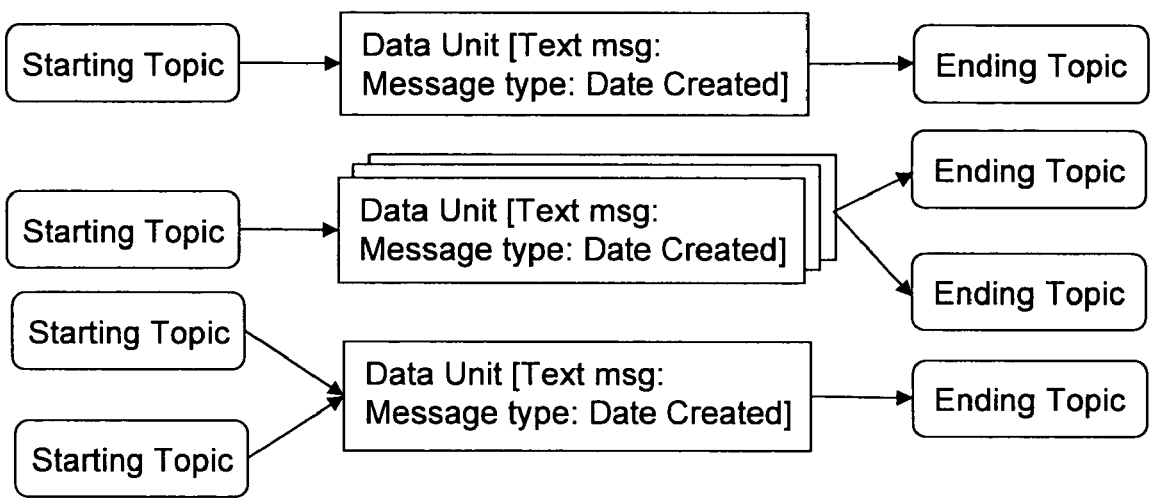
FIG. 16 is an explanatory diagram that depicts one example of another data format that forms the basis of the topic net.

FIG. 16 is an explanatory diagram that depicts another example of a data collection forming the basis of a topic net. In this data collection, a "Data Unit", a "Starting Topic" and an "Ending Topic" are correlated and stored. Each data unit includes a text message generated by segmenting a travel journal prepared by a user into suitable lengths as messages for single turns in a conversation. It is also acceptable to use the data unit of a travel journal written while preparing a data unit, without generating a data unit by sectioning an already written travel journal. In addition, in this example, the data unit is text data, but it is also acceptable that it be image data or voice data.

The starting topic is the topic that triggered the output of the data unit text message. The ending topic is the destination topic arrived at due to the contents of the data unit text message. As shown in FIG. 16, it is acceptable that there be a plurality of either starting topics or ending topics. If there is a plurality of starting topics, it means that the identical text message is output from the plurality of topics, and that the dialog transitions to the identical topic. Conversely, if there is a plurality of ending topics, it means that the identical text message is output from the identical topic, and that the dialog transitions to one of a plurality of topics as a result.

A data unit includes a message type that indicates the category of the text message. Selecting one of the message types included in the dialog information sets the message type. In addition, the data unit may include other supplementary information. For example, it may include the creation date and time of the text message, and the author of the text message.

Figure 17:
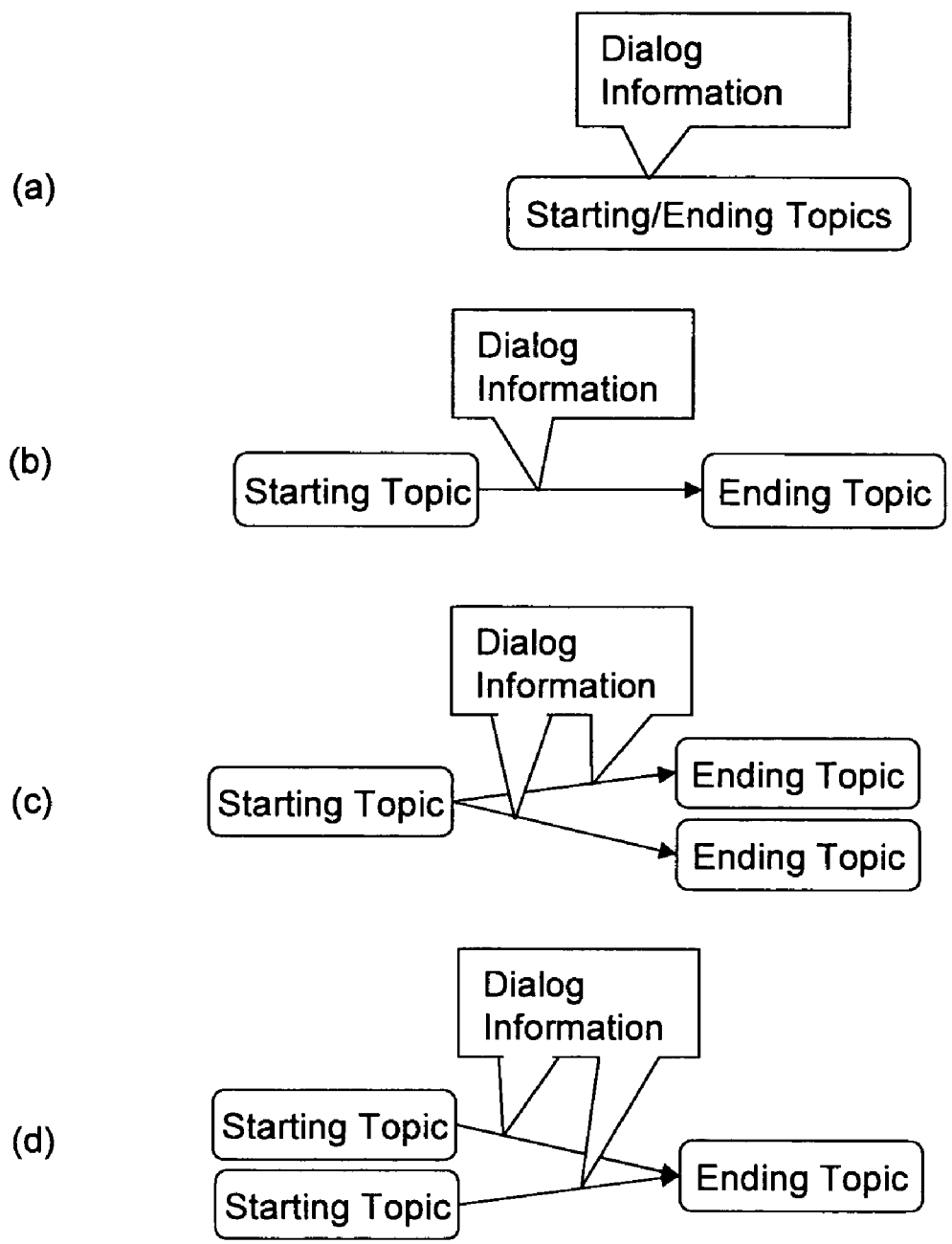
FIG. 17 is an explanatory diagram that depicts a topic net fragment generated based on the data depicted in FIG. 16.

FIG. 17 is an explanatory diagram that depicts the method of generating a topic net fragment based on the collection of data depicted in FIG. 16. First, one set of a starting topic, a data unit, and an ending topic is read. If either the starting topic or the ending topic is a plurality, then the plurality of starting topics or ending topics are read collectively. Subsequently, the nodes corresponding to the starting topic and the ending topic that were read, and the topics of the nodes, are generated. If a node already exists having a topic the same as a new node to be generated, then a node with the same topic is not newly generated. A topic is the starting topic or the ending topic that was read. In addition, a link is generated that links the nodes from the starting topic to the ending topic. Furthermore, dialog information associated with the generated link is generated based on the data unit. Here, the message type of the dialog information forms the message type of the data unit. In addition, the text message of the dialog information forms the text message included in the data unit. If the starting topic and the ending topic are the same, then the dialog information generated based on the data unit is associated with the node having that topic. If the starting topic or the ending topic is a plurality, then there will exist a plurality of links arising from that starting topic, or links connected to that ending topic. To such a plurality of links is associated the dialog information generated from the identical data unit. In so doing, a topic net fragment is generated and one topic net can be generated by joining all fragments together.

Providing the data unit with supplementary information enables the modification of the dialog information to be generated, and not the text message itself included in the data unit. For example, let us consider the case of a data unit that includes the creation date and time of a text message. In this case, the creation date and time is verified at the stage of generating the message of the dialog information. Furthermore, if it is old information that has lapsed beyond a fixed period of time, then it is possible to create the message of the dialog information to which a preface, such as, "This is from a while back, but" is joined to the text message. In addition, if there is a plurality of data units that includes the same message type for the same topic or link, then any one of the data units can be selected based on the supplementary information. Thereby, the dialog information can also be generated based on the selected data unit. For example, if the data unit includes a creation date and time, the dialog information can be generated based on the latest data unit. In addition, for example, if the author of the text message and the data unit is provided as supplementary information, then the text message of a popular author can become the basis of the preferential generation of dialog information.

Figure 18:
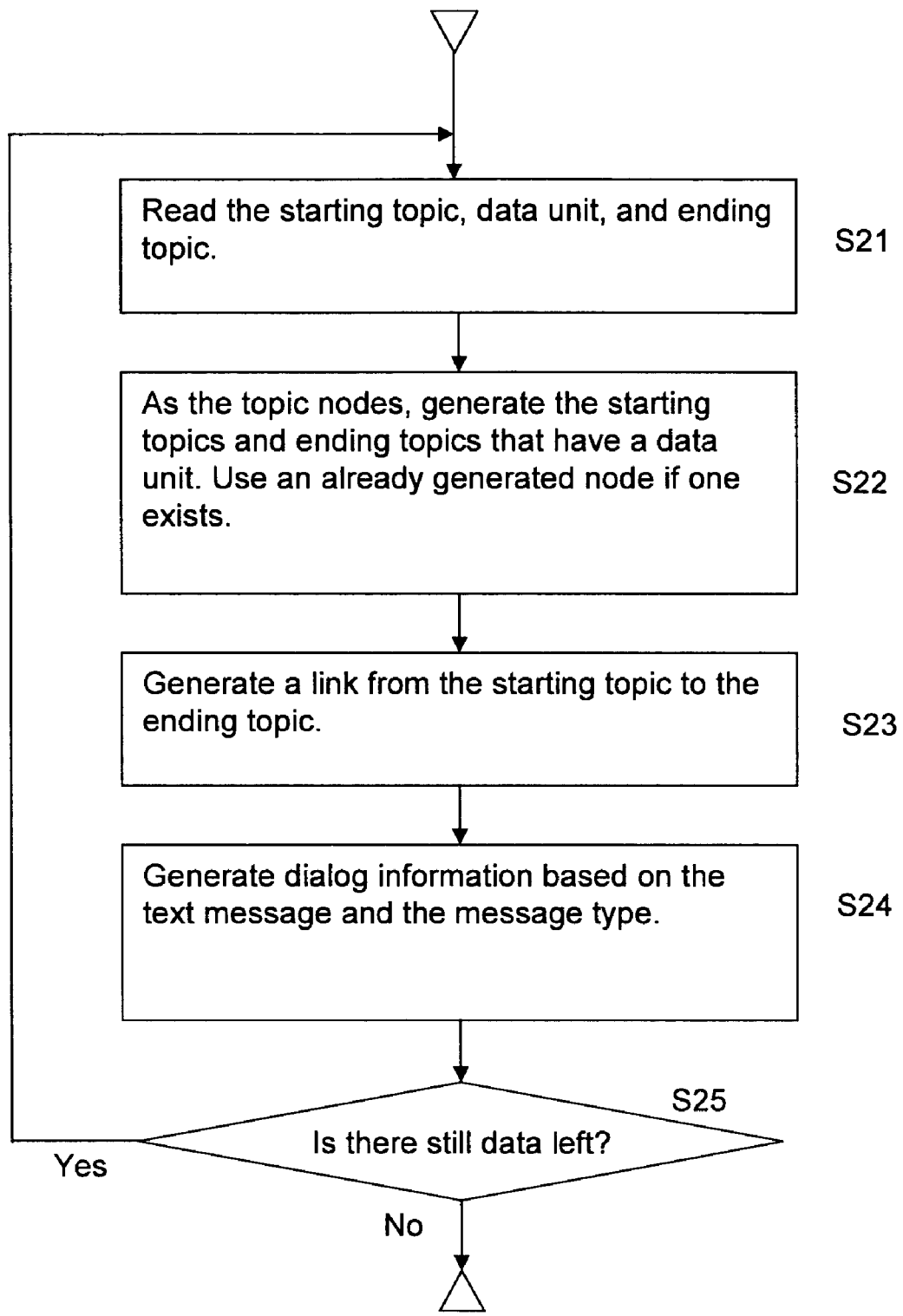
FIG. 18 is a flowchart that depicts one example of the generation processing flow that generates a topic net based on the data depicted in FIG. 16.

FIG. 18 is a flowchart that depicts one example of the generation processing flow by which the topic net management unit 1 generates a topic net based on text data.

Step S21: First, the topic net management unit 1 reads one set of a starting topic, a data unit, and an ending topic.

Step S22: Subsequently, the topic net management unit 1 generates nodes with the starting topic and the ending topic as the topics. If the node of a topic has already been generated, then a node having the identical topic is not newly generated.

Step S23: The topic net management unit 1 generates a link from the node corresponding to the starting topic to the node corresponding to the ending topic.

Step S24: Furthermore, the topic net management unit 1 generates dialog information based on the text message, the message type, and the like, included in the data unit.

Step S25: The topic net management unit 1 repeats Steps S21-S24 processing for all sets.

The above processing enables the generation of a topic net based on data that is not in table format or tree format, e.g., data such as a travel journal or a product review prepared by an individual, and the generation of a topic net that includes specific topics.

Using the present invention enables the efficient creation of a topic net that includes a broad range of topics. In addition, the present invention enables the generation of a topic net based on a broad range of information sources. If a topic net generated using the present invention is applied to an interactive system that performs a dialog with a person, then a dialog having a wealth of topics and a natural flow can be conducted.

This application claims priority to PCT Application No. PCT/JP03/00610. The entire disclosure of PCT Application No. PCT/JP03/00610 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of generating, on a computer readable recording medium, a data structure representing a topic net for generating dialog information, the data structure including a plurality of nodes associated with topics and a plurality of links connecting the nodes, comprising:
   causing execution of operations by a computer processor including:
   reading from a computer readable recording medium one record from a data table including a plurality of records, each record including field data associated with a plurality of fields;
   storing in the computer readable recording medium topic classes, associations between the topic classes and the plurality of fields of the read record, and associations between each of the topic classes, respectively;
   storing in the computer readable recording medium templates having fields embeddable with field data and the template fields associated with the stored topic classes respectively;
   generating nodes with respect to the fields associated with the field data included in the read record, the fields associated with any one of the stored topic classes, by:
   specifying a plurality of nodes corresponding to one topic based upon the field data in the read record, and
   stopping generation of duplicate nodes by not generating a node having a topic same as a node specified in the specifying of the plurality of nodes;
   generating topics corresponding to said generated nodes and storing the generated topic classes;
   linking each of the nodes generated in accordance with the stored associations between each of the topic classes; and
   generating dialog information by completing the blank fields in a template with the field data in the read record, wherein the fields associated with the field data of the read record and the blank fields correspond to same topic classes respectively and the fields are associated with any one of the stored topic classes including the generated topic classes.

2. The topic net generation method as recited in claim 1, further comprising storing in the computer readable recording medium a dialog information generating rule for generating dialog information that includes a message used to advance the dialog based on said topic net;
   wherein said dialog information generating rule generates said dialog information based on field data described in a field corresponding to two topic classes associated.

3. The topic net generation method as recited in claim 2, wherein said dialog information generating rule further includes a direction that indicates from which node to which node, among the nodes of said two topic classes, the generated dialog information will be used to advance the dialog.

4. The topic net generation method as recited in claim 2, wherein said dialog information generating rule further includes a message type that indicates what kind of property said message has.

5. A topic net generating apparatus that generates a data structure representing a topic net that for generating dialog information, the data structure including a plurality of nodes associated with topics and a plurality of links that link connecting the nodes, comprising:
   a computer readable recording medium storing a data table including a plurality of records, each record including field data associated with a plurality of fields; and
   a computer processor executing:
   reading one record of the data table;
   storing topic classes, associations between the topic classes and said plurality of fields of the read record, and associations between each of the topic classes, respectively;
   storing templates having fields embeddable with field data and the template fields associated with the stored topic classes respectively;
   generating nodes with respect to the fields associated with the field data included in the read record, the fields associated with any one of the stored topic classes, by:
   specifying a plurality of nodes corresponding to one topic based upon the field data in the read record, and
   stopping generation of duplicate nodes by not generating a node having a topic same as a node specified in the specifying of the plurality of nodes;
   generating topics corresponding to said generated nodes and storing the generated topic classes;
   linking each of the nodes generated in accordance with the stored associations between each of the topic classes; and
   generating dialog information by completing the blank fields in a template with the field data in the read record, wherein the fields associated with the field data of the read record and the blank fields correspond to same topic classes respectively and the fields are associated with any one of the stored topic classes including the generated topic classes.

6. A computer readable recording medium storing a topic net generating program that generates a data structure representing a topic net for generating dialog information, the data structure including a plurality of nodes associated with topics and a plurality of links connecting the nodes, by causing a computer to execute:
   reading one record from a data table including a plurality of records, each record including field data associated with a plurality of fields;
   storing topic classes, associations between the topic classes and the plurality of fields of the read record, and associations between each of the topic classes, respectively;
   storing templates having fields embeddable with field data and the template fields associated with the stored topic classes respectively;
   generating nodes with respect to the fields associated with the field data included in the read record, the fields associated with any one of the stored topic classes, by:
   specifying a plurality of nodes corresponding to one topic based upon the field data in the read record, and
   stopping generation of duplicate nodes by not generating a node having a topic same as a node specified in the specifying of the plurality of nodes;

generating topics corresponding to said generated nodes and storing the generated topic classes;

linking each of the nodes generated in accordance with the stored associations between each of the topic classes; and generating dialog information by completing the blank fields in a template with the field data in the read record, wherein the fields associated with the field data of the read record and the blank fields correspond to same topic classes respectively and the fields are associated with any one of the stored topic classes including the generated topic classes.

7. The method according to claim 1, wherein the reading of the record is from a data file storing field data associated with a plurality of fields in a tree structure.

8. The topic net generating apparatus according to claim 5, wherein the reading of the record is from a data file storing field data associated with a plurality of fields in a tree structure.

9. The computer readable recording medium according to claim 6, wherein the reading of the record is from a data file storing filed data associated with a plurality of fields in a tree structure.

10. A topic net generation method that includes nodes associated with topics, and links that link each of the nodes, comprising:

causing execution of operations by a computer processor including:

reading a data unit, storing a starting topic and an ending topic that are correlated, based upon the reading of the data unit;

generating nodes corresponding to the read starting topic and ending topic, generating topics corresponding to said generated nodes, and storing the generated topics by:

specifying a plurality of nodes corresponding to one topic based upon the reading of the data unit, the starting tope and the ending topic, and stopping generation of duplicate nodes by not generating a node having a topic same as a node specified in the specifying of the plurality of nodes;

generating the topic net by generating a link from a node corresponding to said starting topic to a node corresponding to said ending topic, including the generated nodes;

storing templates having fields embeddable with field data and the template fields associated with the stored topics; and generating dialog information, which includes a message used to advance a dialog, by completing a template with the read data unit, wherein topics of the read data unit include any one of the stored generated topics and are same as topics of the blank fields, and a message type that indicates a property of said message, and associating said dialog information with a generated link, wherein said data unit includes a text message, and a data type that indicates the property of said text message, wherein said data unit further includes supplementary information, wherein the generating of the nodes further includes determining whether the node corresponding to said starting topic and the node corresponding to said ending topic are identical nodes, and wherein if there exists a plurality of data units that include the same data type for identical links or identical nodes, then the generating of the dialog information selects any one of the data units based on said supplementary information, and generates dialog information based on the selected data unit.

11. A topic net generation apparatus that generates a topic net that includes nodes associated with topics, and links that link each of the nodes, comprising:

a computer readable recording medium storing a data unit; and a computer processor executing:

reading the data unit, storing a starting topic and an ending topic that are correlated, based upon the reading of the data unit;

generating nodes corresponding to the read starting topic and ending topic, generating topics corresponding to said generated nodes, and storing the generated topics by:

specifying a plurality of nodes corresponding to one topic based upon the reading of the data unit, the starting tope and the ending topic, and stopping generation of duplicate nodes by not generating a node having a topic same as a node specified in the specifying of the plurality of nodes;

generating a link from a node corresponding to said starting topic to a node corresponding to said ending topic, including the generated nodes;

storing templates having fields embeddable with field data and the template fields associated with the stored topics; and generating dialog information, which includes a message used to advance a dialog by completing a template with the read data unit, wherein topics of the read data unit include any one of the stored generated topics and are same as topics of the blank fields, and a message type that indicates a property of said message, and associating said dialog information with a generated link, wherein said data unit includes a text message, and a data type that indicates the property of said text message, wherein said data unit further includes supplementary information, wherein the node generating unit further determines whether the node corresponding to said starting topic and the node corresponding to said ending topic are identical nodes, and wherein if there exists a plurality of data units that include the same data type for identical links or identical nodes, then the dialog information generating unit selects any one of the data units based on said supplementary information, and generates the dialog information based on the selected data unit.

12. A computer readable recording medium storing a topic net generation program that generates a topic net that includes nodes associated with topics, and links that link each of the nodes, by causing a computer to execute:

reading a data unit storing a starting topic and an ending topic that are correlated, based upon the reading of the data unit;

generating nodes corresponding to the read starting topic and ending topic, generating topics corresponding to said generated nodes, and storing the generated topics by:

specifying a plurality of nodes corresponding to one topic based upon the reading of the data unit, the starting tope and the ending topic, and stopping generation of duplicate nodes by not generating a node having a topic same as a node specified in the specifying of the plurality of nodes;

generating the topic net by generating a link from a node corresponding to said starting topic to a node corresponding to said ending topic, including the generated nodes;

storing templates having fields embeddable with field data and the template fields associated with the stored topics; and generating dialog information, which includes a message used to advance a dialog by completing a template with the read data unit, wherein topics of the read data unit include any one of the stored generated topics and are same as topics of the blank fields, and a message type that indicates a property of said message, and associating said dialog information with a generated link, wherein said data unit includes a text message, and a data type that indicates the property of said text message, wherein said data unit further includes supplementary information, wherein the generating of the nodes further includes determining whether the node corresponding to said starting topic and the node corresponding to said ending topic are identical nodes, and wherein if there exists a plurality of data units that include the same data type for identical links or identical nodes, then the generating of the dialog information selects any one of the data units based on said supplementary information, and generates the dialog information based on the selected data unit.

* * * * *

UNITED STATES PATENT AND TRADEMARK OFFICE
CERTIFICATE OF CORRECTION

| | |
|---|---|
| PATENT NO. | : 7,756,897 B2 |
| APPLICATION NO. | : 11/121001 |
| DATED | : July 13, 2010 |
| INVENTOR(S) | : Ryosuke Miyata et al. |

It is certified that error appears in the above-identified patent and that said Letters Patent is hereby corrected as shown below:

Title Page Item (73) Assignee; delete "Fujtisu" and insert --Fujitsu--.

Column 17, Line 22 delete "filed" and insert --field--.

Column 17, Line 38 delete "tope" and insert --topic--.

Column 18, Line 20 delete "tope" and insert --topic--.

Column 18, Line 67 delete "tope" and insert --topic--.

Signed and Sealed this
Seventh Day of June, 2011

David J. Kappos
*Director of the United States Patent and Trademark Office*